United States Patent [19]

Kushnir

[11] Patent Number: 5,484,275
[45] Date of Patent: Jan. 16, 1996

[54] NOZZLE CONSTRUCTION FOR A TRIPLE STACK MOLDING ARRANGEMENT

[75] Inventor: Yosif Kushnir, Kansas City, Mo.

[73] Assignee: Dollins Tool, Inc., Independence, Mo.

[21] Appl. No.: 258,529

[22] Filed: Jun. 10, 1994

Related U.S. Application Data

[63] Continuation of Ser. No. 106,702, Aug. 16, 1993, Pat. No. 5,370,523.

[51] Int. Cl.⁶ .................................................. B29C 45/20
[52] U.S. Cl. .................... 425/190; 425/192 R; 425/549; 425/568; 425/572
[58] Field of Search ................................. 425/190, 192 R, 425/549, 568, 569, 572, 588, DIG. 227; 264/328.15

[56] References Cited

U.S. PATENT DOCUMENTS

| | | | |
|---|---|---|---|
| 3,281,898 | 11/1966 | Compton | 425/568 |
| 3,553,788 | 1/1971 | Putkowski | 425/192 R |
| 3,663,145 | 5/1972 | Teraoka | 425/588 |
| 3,843,294 | 10/1974 | Bielfeldt et al. | 425/572 |
| 3,934,626 | 1/1976 | Hall | 425/568 |
| 4,787,836 | 11/1988 | Osuna-Diaz et al. | 425/568 |
| 4,971,747 | 11/1990 | Sorensen | 264/297.2 |
| 5,208,052 | 5/1993 | Schmidt et al. | 425/568 |
| 5,229,145 | 7/1993 | Brown et al. | 425/563 |

FOREIGN PATENT DOCUMENTS

| | | |
|---|---|---|
| 2022060 | 1/1992 | Canada. |
| 103363 | 3/1984 | European Pat. Off.. |
| 3544155 | 7/1987 | Germany. |
| 49-4067 | 1/1974 | Japan. |
| 50-5216 | 3/1975 | Japan. |
| 58-14728 | 1/1983 | Japan. |

*Primary Examiner*—James P. Mackey
*Attorney, Agent, or Firm*—Kokjer, Kircher, Bowman & Johnson

[57] ABSTRACT

A triple stack mold which is operated by a standard mold press and which presents three molding interfaces. Molten plastic is supplied to all molding cavities in equal amounts through a distribution system that includes manifolds in the mold components which receive the plastic and distribute it through passages leading to the mold cavities. The main passages leading to the manifolds are equipped with special nozzles constructed to compensate for differential thermal expansion of the mold parts.

6 Claims, 2 Drawing Sheets

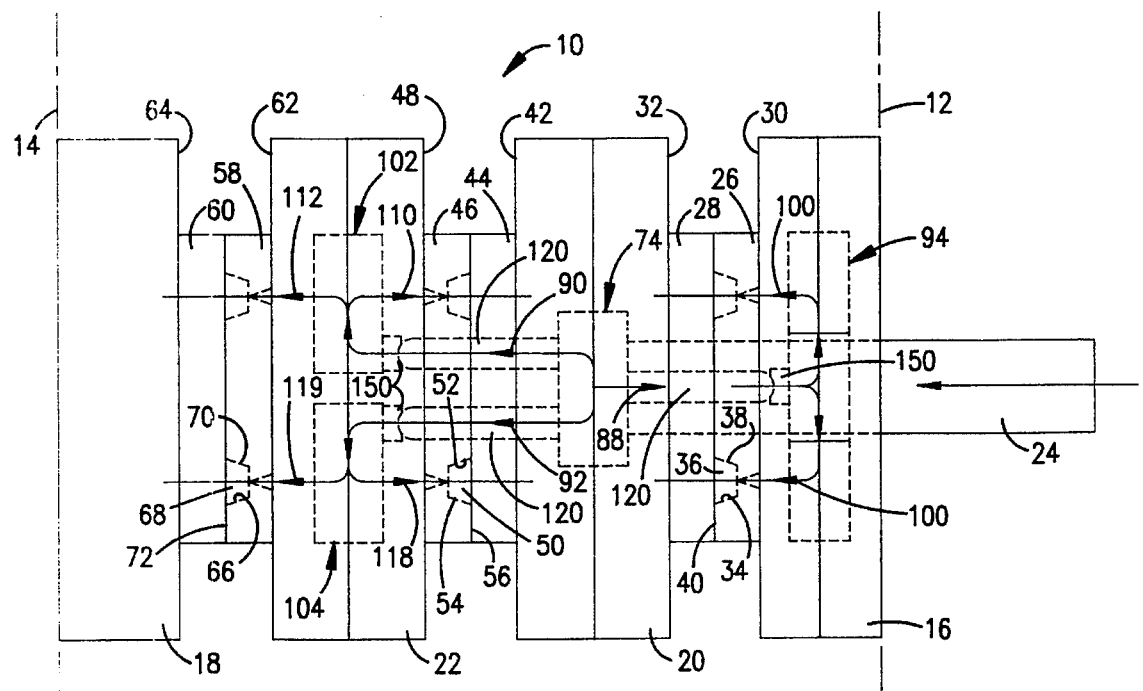
Fig. 1.
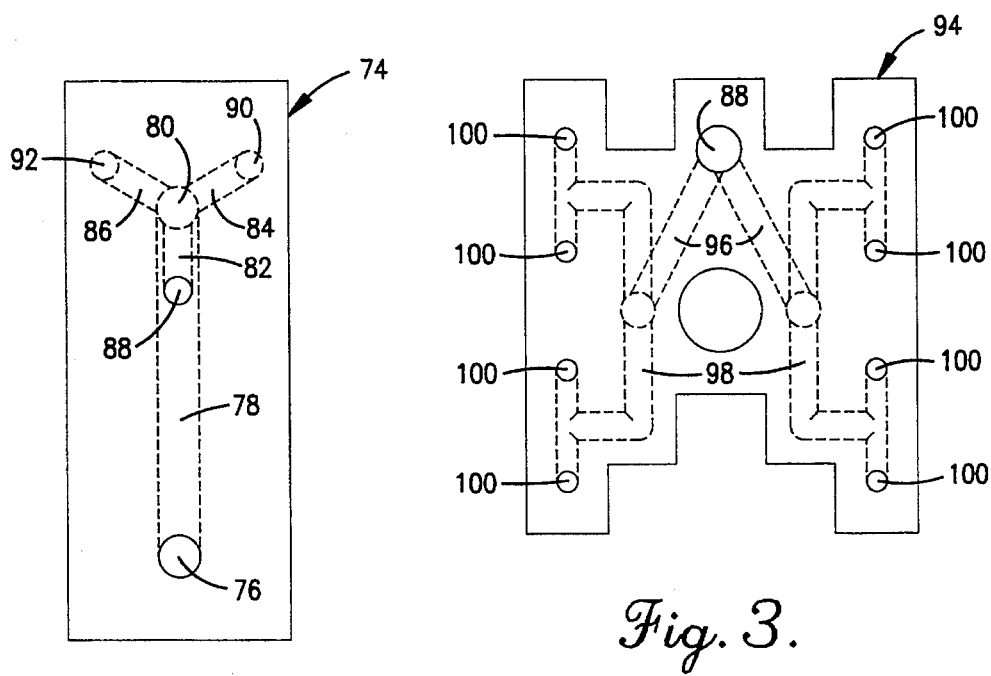
Fig. 2.
Fig. 3.

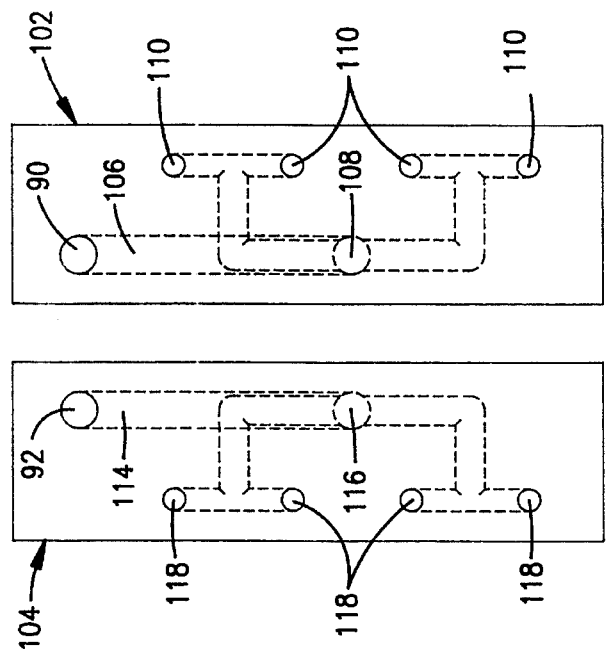
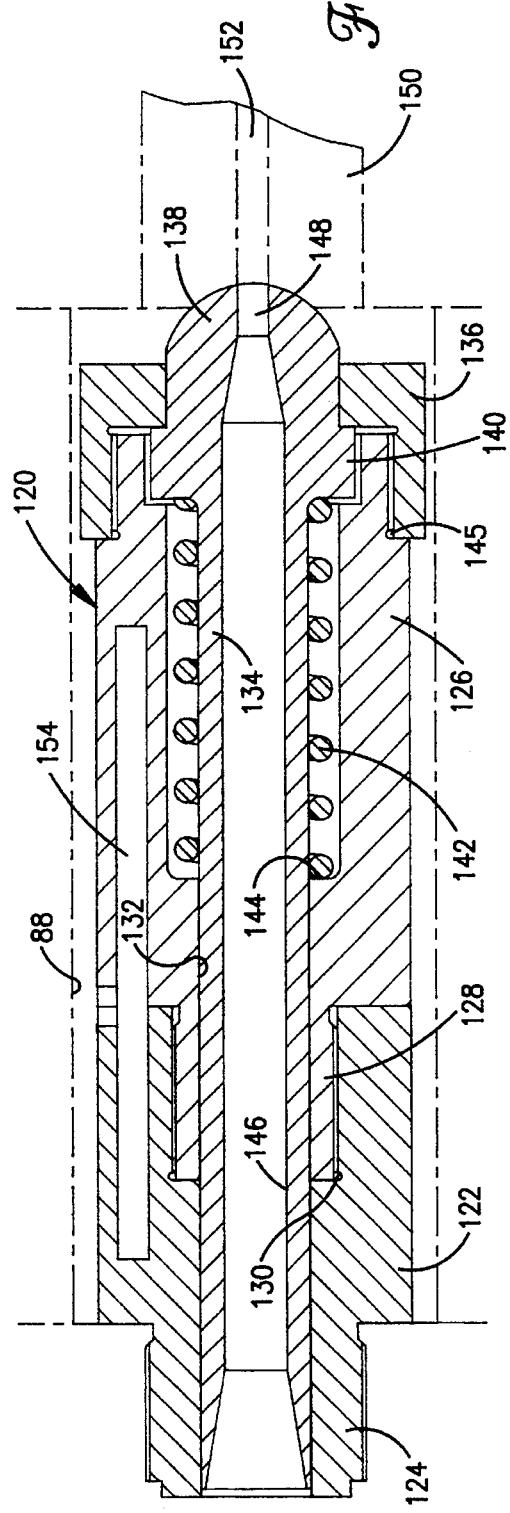

NOZZLE CONSTRUCTION FOR A TRIPLE STACK MOLDING ARRANGEMENT

This is a continuation of application Ser. No. 08/106,702, filed Aug. 16, 1993, now U.S. Pat. No. 5,370,523.

FIELD OF THE INVENTION

This invention relates generally to the injection molding industry and deals more particularly with a stack mold arranged to make use of a standard molding press to carry out molding operations at three different molding interfaces for the production of plastic molded parts.

BACKGROUND OF THE INVENTION

Stack molds have been in use for a number of years to produce injection molded parts of various types, including plastic containers for the packaging industry. In this type of molding operation, a molding press is operated hydraulically and/or mechanically to open and close the mold and hold it closed while molten plastic is injected into the mold cavities. Standard industry practice is to make use of two molding interfaces which are brought together when the press is operated to close the mold and separated when the mold is opened to allow ejection of the molded parts from the machine. This type of molding operation is prevalent in the industry and has resulted in standardization of the available molding presses at a size large enough to accommodate the molding components necessary to carry out two level molding in the press.

Two level stack molding achieves double the production rate of single level molding. The die sets which include the core and cavity plates that come together to form the mold cavities can normally be interchanged to accommodate a change over to a different part.

Canadian Patent No. 2,022,060 to Travaglini et al. discloses a four level stack mold representing an attempt to enhance the production rate. In this arrangement, four mold interfaces are employed in order to produce twice as many parts as a two level mold. However, this increased production is achieved at the expense of trade offs that largely negate the benefits in many applications. In particular, using a four level mold system in a standard press has the disadvantage that the mold blocks occupy so much room that their separation when the mold is opened is minimal. Consequently, parts such as tall plastic containers or anything else having significant height cannot be molded in this type of operation. Instead, only shallow parts such as container lids are practical to mold on a four level system because the mold components cannot be separated far enough to allow deeper or taller parts to be ejected from the mold. The ability to mold only shallow parts is a severe limitation which drastically reduces the practical utility of a four level stack mold system.

In a multiple level mold, problems are also encountered in delivering the molten plastic in a balanced manner to each of the mold cavities. Thermal expansion problems are increased when longer flow paths for the plastic are required. While balancing the plastic flow is not particularly difficult in a four level mold because it is symmetrical, this aspect of the molding operation nevertheless becomes more complex and potentially troublesome with an increased number of molding components.

SUMMARY OF THE INVENTION

The present invention is directed to a stack mold in which a standard molding press is used with mold components that are constructed and arranged to provide three molding levels or interfaces. This has the advantage of increasing the production output by 50% compared to standard two level molding operations. Unlike a four level system, the triple stack mold system of the present invention is able to use a standard molding machine press for the production of taller parts because the mold components can be separated far enough to allow relatively tall parts to be ejected from the mold.

In the design and construction of a triple stack mold, problems are encountered that are not of much concern in two or four level molds. Balanced and efficient distribution of the molten plastic to the mold cavities is particularly difficult in a triple mold system because of the lack of symmetry resulting from the uneven number of molding interfaces. This problem is solved in accordance with the present invention by providing manifolds in the mold components which are uniquely arranged to cooperate with internal passages which distribute the molten plastic to the mold cavities in equal amounts for balanced plastic application in the system.

The problems of differential thermal expansion of the parts and tolerance variations are solved through the use of a nozzle which is specially constructed to compensate for thermal expansion and also to accommodate different sets of die plates which vary in thickness.

DESCRIPTION OF THE DRAWINGS

In the accompanying drawings which form a part of the specification and are to be read in conjunction therewith and in which like reference numerals are used to indicate like parts in the various views:

FIG. 1 is a diagrammatic top plan view of a triple stack mold constructed according to a preferred embodiment of the present invention, with the mold depicted in the closed position;

FIG. 2 is an enlarged sectional view taken on a vertical plane through the manifold section of the distributor block included in the triple stack mold;

FIG. 3 is an enlarged sectional view taken on a vertical plane through the manifold section of the stationary platen in the triple stack mold;

FIG. 4 is an enlarged sectional view through the feed block of the triple stack mold, taken on a vertical plane and showing the two manifolds in the feed block; and FIG. 5 is a sectional view on an enlarged scale showing one of the injection nozzles included in the triple stack mold.

DETAILED DESCRIPTION OF THE INVENTION

Referring now to the drawings in more detail and initially to FIG. 1, numeral 10 generally designates a three level stack mold constructed in accordance with the present invention. The mold 10 is installed in a standard hydraulic molding press having a stationary clamp plate 12 at one end and an opposing moving clamp plate 14 at the opposite end. The mold 10 includes a stationary platen 16 secured to the stationary clamp plate 12 and a moving platen 18 secured to the moving clamp plate 14. The other main components of the mold 10 are a distributor block 20 and a feed block 22. An injection bar 24 introduces molten plastic to the mold 10 in a conventional manner.

The confronting faces of the platens and mold blocks are provided with complementary sets of interchangeable die plates that cooperate to form mold cavities each having the shape of the article that is to be molded. Complementary die plates 26 and 28 are mounted respectively on the inner face 30 of platen 16 and on the face 32 of the distributor block 20 which faces toward platen 16. The die plate 26 is a cavity plate having a plurality of cavities 34 which receive complementary cores 36 that project from die plate 28. The cavities 34 and cores 36 cooperate to present a plurality of mold cavities 38 at the interface 40 formed between the die plates 26 and 28 when the mold is closed. The mold cavities 38 are shaped to form the parts that are to be molded by the machine, such as plastic container bodies for packaging and other products.

The opposite face 42 of the distributor block 20 is provided with another die plate 44 which cooperates with a complementary die plate 46 which is carried on the face 48 of the feed block 22 that faces toward the distributor block. The die plate 44 is a core plate having a plurality of projecting cores 50 that are received in complementary cavities 52 in plate 46 when the mold is closed. The cores 50 and cavities 52 cooperate to provide mold cavities 54 in the shape of the parts that are to be molded. The mold cavities are located at the interface 56 between the die plates 44 and 46.

A final pair of complementary die plates 58 and 60 are included in the mold 10. The die plate 58 is carried on the face 62 of feed block 22 that faces toward the moving platen 18. The other die plate 60 is carried on the inner face 64 of platen 18. The die plate 58 is a cavity plate having a plurality of cavities 66. Cores 68 which project from die plate 60 are received in the cavities 66 when the mold is closed to present mold cavities 70 at the interface 72 formed between the die plates 58 and 60.

The distributor block 20 is provided with an internal distribution manifold which is generally identified by numeral 74 and depicted in detail in FIG. 2. An inlet passage 76 extends from the injector bar 24 through the stationary platen 16, through the die plates 26 and 28 and into the distributor block 20 to the manifold 74. Passage 76 thus provides a flow passage to manifold 74 for all of the incoming molten plastic that is injected through the injection bar 24. The manifold 74 includes another passage 78 which connects with the end of the inlet passage 76 and leads to a passage 80. Three short passages 82, 84 and 86 extend in a radial pattern from the passage 80 and are equal to one another in size. Passage 82 connects with an outlet passage 88 which extends to the stationary platen 16. Passages 84 and 86 lead to respective outlet passages 90 and 92 which extend to the feed block 22, as will be explained more fully.

The stationary platen 16 is provided with an internal manifold which is generally identified by numeral 94 and is best shown in FIG. 3. The outlet passage 88 from the distribution manifold 74 extends through block 20, die plates 28 and 26, and into platen 16 to the manifold 94. The end of passage 88 connects with a pair of angled passages 96 which lead to connection with another pair of passages 98. Each of the passages 98 connects at its upper and lower ends with a pair of smaller passages 100 which lead to the bases of the mold cavities 38 in die plate 26. The passageways which lead to each of the passages 100 are equal in size and length so that the incoming molten plastic is distributed in a balanced manner and is applied in equal amounts to each of the mold cavities 38.

The feed block 22 is provided with a pair of manifolds 102 and 104 which are best depicted in FIG. 4. The outlet passage 90 from the distribution manifold 74 extends through die plates 44 and 46 and into block 22 to the manifold 102. The end of passage 90 connects with another passage 106 which leads to another passage 108. Passage 108 connects through additional passages with four smaller passages 110 which lead to the bases of the cavities 52 on one side of the die plate 46. A similar passage system connects passage 108 with four additional passages 112 (see FIG. 1) which lead to the bases of the cavities 66 on one side of the die plate 58.

With continued reference to FIG. 4 in particular, the outlet passage 92 from the distribution manifold 74 leads to manifold 104 and connects with one end of another passage 114. The other end of passage 114 connects with another passage 116 which connects through additional passages with four small passages 118 leading to the bases of the cavities 52 on one side of the die plate 46. Through a similar arrangement of passages, passage 116 connects with four additional passages 119 (FIG. 1) which lead to the bases of the cavities 66 on one side of the die plate 58.

It is noted that the lengths and sizes of the passages leading to each of the mold cavities at all three interfaces 40, 56 and 72 are equal so that the flow of molten plastic is balanced throughout the mold system and each of the mold cavities is supplied with an equal amount of molten plastic. Although the drawings show eight mold cavities at each of the mold interfaces, it is to be understood that a different number of the mold cavities can be provided at each of the interfaces.

The main passages 88, 90 and 92 that lead from the distribution manifold 74 to the other manifolds 94, 102 and 104 are each provided with a specially constructed nozzle 120. The nozzle 120 for the passage 88 is illustrated in detail in FIG. 5, and the nozzles 120 for the other passages 90 and 92 are constructed identically.

Referring to FIG. 5, the nozzle 120 includes a base 122 having a tail section 124 which is threaded to the distributor block 20. A body section 126 of the nozzle has a projecting barrel 128 which fits in and is threaded to a counter bore area on the base 122. A seal ring 130 provides a seal between the body 126 and the base 122.

The base 122 and body 126 cooperate to provide a bore 132 which receives the elongated shank of a hollow nozzle element 134. The nozzle 134 is held in the bore 132 by an end cap 136 which is threaded onto the end of the body 126. The nozzle element 134 has a head portion 138 which projects through the end cap 136. An enlarged flange 140 adjacent to the head 138 abuts the end cap 136 to limit extension of the head 138 out of the body. The flange 140 is maintained against the end cap 136 by a compression spring 142 which acts against the flange 140 at one end and at the other end against a shoulder 144 formed internally of the body 126. A seal ring 145 provides a seal between the body 126 and the end cap 136.

The nozzle element 134 has an axial passage 146 extending through it. The passage 146 is restricted in size at its outlet end 148. The head 138 of the nozzle element has a spherical surface which, when the mold is closed, fits against and mates with a spherical indentation formed in a seat 150 located in platen 16 adjacent to the manifold 94. The seat 150 has a passage 152 that connects with the outlet 148 when the nozzle element is seated. One or more cartridge heaters 154 are located partially in the base 122 and partially in the body 126 to reduce the heat loss of the molten plastic that flows through the passage 146.

In operation, the mold 10 is closed by the molding press which pulls clamp plate 14 toward the stationary clamp plate 12. In the closed condition of the mold, the complementary pairs of die plates are held against one another at the molding interfaces 40, 56 and 72. Molten plastic is then injected through the injection bar 24 and through passage 76 to the distribution manifold 74. From the distribution manifold, the plastic flows in equal parts through the three outlet passages 88, 90 and 92, thus being applied to the manifolds 94, 102 and 104 in equal amounts. From these manifolds, the plastic flows to each of the mold cavities in equal amounts so that the mold cavities are all filled with plastic and the flow is balanced throughout the system.

The mold 10 is opened by the operation of the press moving the clamp plate 14 away from clamp plate 12, thus separating the complementary pairs of die plates and withdrawing the mold cores from their complementary cavities. The molded parts can then be ejected from the cavities or cores using conventional techniques, and the next molding cycle is then initiated. The molding press is a standard commercially available unit that operates hydraulically through a linkage system in order to open and close the mold.

It is noteworthy that because only three molding interfaces are provided in the stack mold 10, the mold blocks occupy less room than in the case of a four level mold. Consequently, the die plates can be separated far enough in a conventional molding press to allow relatively tall parts to be ejected from their mold cavities. For example, relatively tall plastic containers can be molded through use of the mold 10 in a standard press, and the presence of three molding interfaces results in a production output that is 50% higher than in the case of a two level molding operation. The standard press is used at its normal tonnage.

The special nozzles 120 provide compensation for tolerance variations and differential thermal expansion rates and also accommodate different sets of die plates that vary in thickness. As previously indicated, the die plates can be quickly removed and replaced by alternate die plates that provide mold cavities to produce different parts. In the event that the replacement die plates differ in their thickness from the die plates that were previously used, the body 126 of the nozzle 120 can be unthreaded from the base 122 which remains permanently in place in the distributor block 20. A different body 126 having a different length selected to accommodate the die plates that are to be used is then threaded into the base 122. The molding process can then be carried out in the manner indicated previously.

The spring 142 continuously urges the nozzle element 134 to the right as viewed in FIG. 5. In the event of thermal expansion during operation of the mold, the spring can yield and allow the nozzle element 134 to retract to the left to a limited extent. Consequently, the normal effects of thermal expansion do not adversely effect the operation of the mold.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, what is claimed is:

1. A nozzle construction for a stack mold having a flow passage for molten plastic extending between a pair of mold parts which separate when the mold is opened, said nozzle construction comprising:

a base for installation in the passage in one of the mold parts;

a body having a detachable connection with said base and a length to extend in the passage into the other of the mold parts, said base and body cooperating to present a bore therethrough;

a nozzle element having a shank mounted in said bore for axial sliding and a head projecting out of said body to mate with a seat on said other mold part, said nozzle element having a passageway therethrough presenting a flow path for the plastic;

means for limiting the extension of said head out of the body; and spring means for urging said nozzle element in a direction to maintain said head on said seat in the event of differential thermal expansion of portions of the mold.

2. The nozzle construction of claim 1, including a detachable end cap on said body providing said limiting means.

3. The nozzle construction of claim 1, including at least one body member interchangeable with said body and having a different length than said body.

4. The nozzle construction of claim 1, including heating means located partly in said base and partly in said body.

5. The nozzle construction of claim 1, wherein said limiting means comprises:

a detachable end cap on said body; and an enlarged portion of the nozzle element engageable with said end cap to limit movement of the nozzle element out of the body.

6. The nozzle construction of claim 5, wherein said spring means acts against said enlarged portion of the nozzle element to maintain said enlarged portion against said end cap.

* * * * *